United States Patent [19]

Hass

[11] 4,017,569

[45] Apr. 12, 1977

[54] ANODE VIBRATOR AND PRESS

[75] Inventor: Wynn M. Hass, Owensboro, Ky.

[73] Assignees: Southwire Company, Carrollton, Ga.; National Steel Corporation, Pittsburgh, Pa.

[22] Filed: May 12, 1975

[21] Appl. No.: 576,857

Related U.S. Application Data

[60] Division of Ser. No. 419,862, Nov. 28, 1973, Pat. No. 3,883,278, which is a continuation-in-part of Ser. No. 163,766, July 19, 1971, abandoned.

[52] U.S. Cl. .............................. 264/40.2; 264/40.5; 264/71; 264/105; 425/135; 425/149; 425/167

[51] Int. Cl.[2] .................. G05D 15/00; G05D 15/01

[58] Field of Search ................ 264/40, 71, 72, 105, 264/40.2, 40.5; 100/50; 425/135, 149, 167, 419, 421

[56] References Cited

UNITED STATES PATENTS

| | | | |
|---|---|---|---|
| 2,799,051 | 7/1957 | Coler | 264/40 |
| 3,756,762 | 9/1973 | Maugweiler | 425/421 X |
| 3,907,474 | 9/1975 | Blaser | 425/149 |

*Primary Examiner*—Thomas P. Pavelko
*Attorney, Agent, or Firm*—Van C. Wilks; Herbert M. Hanegan; Stanley L. Tate

[57] ABSTRACT

This disclosure relates to method for forming a carbon anode block using apparatus comprising a movable mold, a feedbox extendable to a position where it is directly above the movable mold, a stationary bolster encompassed by the movable mold, a vibration means attached to the stationary bolster, and a movable press ram mounted for motion in the vertical plane above the stationary bolster and having protrusions extending from the face thereof. Aggregate used in forming carbon anodes is discharged into the feedbox and the feedbox and mold then move upwardly leaving the aggregate contained within the mold. The feedbox is then removed and the vibration means activated to compact the aggregate by expelling the air therefrom. During the compaction of the aggregate, the press ram is brought downward in proximity to the upper surface of the aggregate with the protrusions in the face thereof extending into the aggregate, and control means then continue to move the press ram downward in response to means which sense the compaction rate of the aggregate whereby the aggregate will form about the protrusions during compaction with substantially little or no pressure being applied by the press ram.

8 Claims, 5 Drawing Figures

ANODE VIBRATOR AND PRESS

CROSS-REFERENCE TO RELATED APPLICATIONS

This application is a division of copending application Ser. No. 419,862, filed Nov. 28, 1973, now U.S. Pat. No. 3,883,278, which was a continuation-in-part of a copending application Ser. No. 163,766, filed July 19, 1971, now abandoned.

This invention relates to a method of forming a carbon using apparatus comprising a jarring or vibrating device which is adapted to compact the anode into a dense block more completely and efficiently than prior art apparatus of this type.

In the process of aluminum reduction, carbon anode blocks are used in the reduction cells. In prior art systems of producing carbon anode blocks, calcined petroleum coke aggregate and coal tar pitch binder are discharged into a stationary stand mold and pressed into a block anode by an overhead pass. The density of this anode is not as desirable for use in a reduction cell as is an anode obtained by utilization of the vibrating or jarring apparatus of this invention.

In the aforementioned application of which the parent of this application is a continuation-in-part, it is explained that the press ram which is used to press the carbon aggregate into a block anode includes protrusions in the lower face thereof, such as cones, truncated cones, cylinders, dimples, cubes, and other various shapes which are used to form indentations in the upper face of the anode block. These indentations are used primarily as a means by which the anode control shaft can be affixed and secured to the anode block. Owing to this arrangement, the anode may thereby be raised and lowered in the reduction cell. The anode shaft usually includes a yoke portion at the distal end thereof which is inserted into the indentations formed in the upper face of the anode block and secured therein by solidifying molten metal or the like.

Because of the relatively small surface area of such protrusions, the pressure applied by the press ram against the anode block at such areas is extremely high. Consequently, the prior art methods and apparatus for accomplishing this operation resulted in anode blocks having localized stress areas from which fissures in the block could originate and propagate, and also in regions of higher density relative to the remainder of the block which adversely affect its electrical properties.

In the aforementioned application Ser. No. 163,766, of which the parent of this application is a CIP, there is described an apparatus for forming carbon anode blocks comprising a vertically movable mold having a lower vibrating table disposed therein. During compaction (vibration) of the aggregate, the mold walls move downward by means of hydraulic cylinders at a rate selected to maintain the relative motion between the aggregate and the mold walls at or near zero. Also during compaction, a press is lowered in proximity to the upper surface of the aggregate at a rate corresponding approximately to the compaction rate of the material, applying little or no pressure thereagainst, and allowing the material to freely form around any protrusion extendng from the lower face of the press ram. The vibrating or jarring motion of the mold allows virtually all air trapped between the particles of carbon aggregate to be expelled, thereby compacting the aggregate without the application of a large amount of force by the press ram, and permitting the formations of indentations in the upper surface of the aggregate conforming to the shape of the protrusions in the press ram with the application of substantially little or no pressure being applied by the press ram. Upon completion of material compaction, the vibrating mechanism is deactivated and the press ram is then further lowered to apply sufficient pressure to further compact the material and to finish form the top surface of the material to conform to the shape of the protrusions in the lower face of the press ram.

While it is known from the prior art to form blocks from particulate material by compressing the material in a movable mold after vibration to expel air therefrom, the prior art does not disclose means for controlling the movement of such press rams at a rate corresponding substantially to the compaction rate of the particulate material (i.e., owing to the vibration thereof) whereby the aggregate will form about such protrusions during compaction thereof with substantially no pressure being applied by the ram. For example, in U.S. Pat. No. 2,057,466 issued to P. G. Willets, there is disclosed a molding apparatus which includes a vertically movable mold which is adapted to contain a granular material supported on a bottom plate and vibrated to expel air therefrom by means of a vibrating table. The apparatus further includes a top plate which is adapted to rest on the upper surface of the aggregate and to move downwardly relative to the movable mold in conjunction with a heavy anvil which rests on the top of the plate and which is adapted to provide a compacting force thereagainst. A pneumatic hammer is positioned above the anvil and is adapted to apply impact blows against the anvil to compact and compress the aggregate contained within the mold. As the anvil and top plate move downwardly under the influence of their own weight as well as the impact blows provided by the hammer, the hammer must be continuously repositioned downwardly so that it will be in position to strike the downwardly moving anvil. This is accomplished by hand by means of a rack, pinion, and hand wheel.

It should be understood that the Willetts apparatus does not include means for controlling the movement of the press ram at a rate corresponding substantially to the compaction rate of the aggregate. On the contrary, the Willetts press ram is intended to compact and compress the material during vibration thereof without regard to the degree of pressure being applied.

Similarly, the U.S. Patents to Locke U.S. Pat. No. 3,537,157, Hirt et al. U.S. Pat. No. 3,712,785, Weinhold U.S. Pat. No. 3,555,599 and McElroy U.S. Pat. No. 2,909,826 also fail to disclose any means for controlling the movement of the press ram at a rate corresponding substantially to the compaction rate of the aggregate whereby the aggregate will form about protrusions in the lower face of the ram during compaction with substantially little or no pressure being applied by the ram. While each of these patents discloses a press ram and a vibrating mold, none discloses the cooperation between the vibrating means and the mold to effect the result of the instant invention. In the Locke patent, for example, a packing head is brought down against the aggregate after vibration thereof to compact the material. There is no disclosure of any control means by which the downward movement of the packing head could be controlled in accordance with the compaction rate of the aggregate.

It is, therefore, a primary object of this invention to provide an improved method whereby a carbon anode block may be formed into a more compact and dense product than that provided by prior art method, and which provides a more suitable anode for use in an aluminum reduction cell.

Another object of this invention is to greatly increase the capacity of existing anode presses, or to allow the use of a much smaller press than would normally be required to produce a carbon anode of desirable density.

A further object of this invention is to provide a method of forming carbon anode blocks having indentations formed in the upper surface thereof, while avoiding the formation of deleterious over-stressed areas in the surface thereof.

More particularly, it is an object of this invention to provide a method as above described using a vibrating mold and a vertically movable press ram, and controlling the movement of the press ram at a rate corresponding substantially to the compaction rate of the aggregate from which the anode block is formed, whereby the aggregate will form about the protrusions during compaction thereof with substantially little or no pressure being applied by the press ram.

Briefly described, the method of this invention uses a mold having vertically movable walls which, in their lowermost position, encompass a bolster having a vibrating plate affixed to the upper portion thereof. A feedbox, which is formed by a hollow receptable having upper and lower openings for receiving and discharging calcined petroleum coke aggregate and coal tar pitch binder, is movable to a position over the mold whereupon the aggregate may be discharged therein to be supported on the vibrating plate. The feedbox is then removed and a press ram, having protrusions extending from the lower face thereof, is lowered until the protrusions enter the aggregate. The vibrating mechanism, which may be either pneumatically or electrically activated, is then started and the aggregate compacted due to the air being expelled therefrom.

During the aggregate compaction (vibration), the mold walls are moved downwardly by hydraulic means at a rate selected to maintain the relative motion between the material and mold walls at or near zero. Also, during compaction the press ram is lowered at a rate corresponding approximately to the compaction rate of the aggregate, applying little or no pressure thereagainst, and allowing the aggregate to form around the protrusions in the lower face thereof. This is accomplished by monitoring the compaction rate of the aggregate (i.e., the rate at which the upper surface of the aggregate descends), and generating a control signal in response thereto by which the hydraulic system of the press ram can be controlled to move the press ram downwardly at the appropriate rate.

In one embodiment of the invention, the monitoring means takes the form of a pressure sensor or cell disposed in the lower face of the ram (preferably in one of the protrusions), and an electrical control circuit having limiting means by which the descent of the press ram may be retarded or stopped upon the occurrence of a predetermined pressure sensed at the face of the ram.

In another embodiment of the invention, the monitoring means includes means for generating an electrical current through the aggregate, such current flowing only when the face of the ram makes sufficient contact with the aggregate, which condition would be such as to signal the hydraulic control system of the press ram to retard or stop its descent.

In a preferred embodiment of the above-described electrical monitoring means, a logic circuit is provided which generates FAST ADVANCE, STOP and SLOW ADVANCE signals to the hydralic control system of the press ram whereby the descent of the ram may be more closely controlled.

With the above and other objects in view that may become hereinafter apparent, the nature of the invention may be more clearly understood by reference to the several views illustrated in the attached drawings, the following detailed description thereof, and the appended claimed subject matter;

IN THE DRAWINGS

Figure 1:
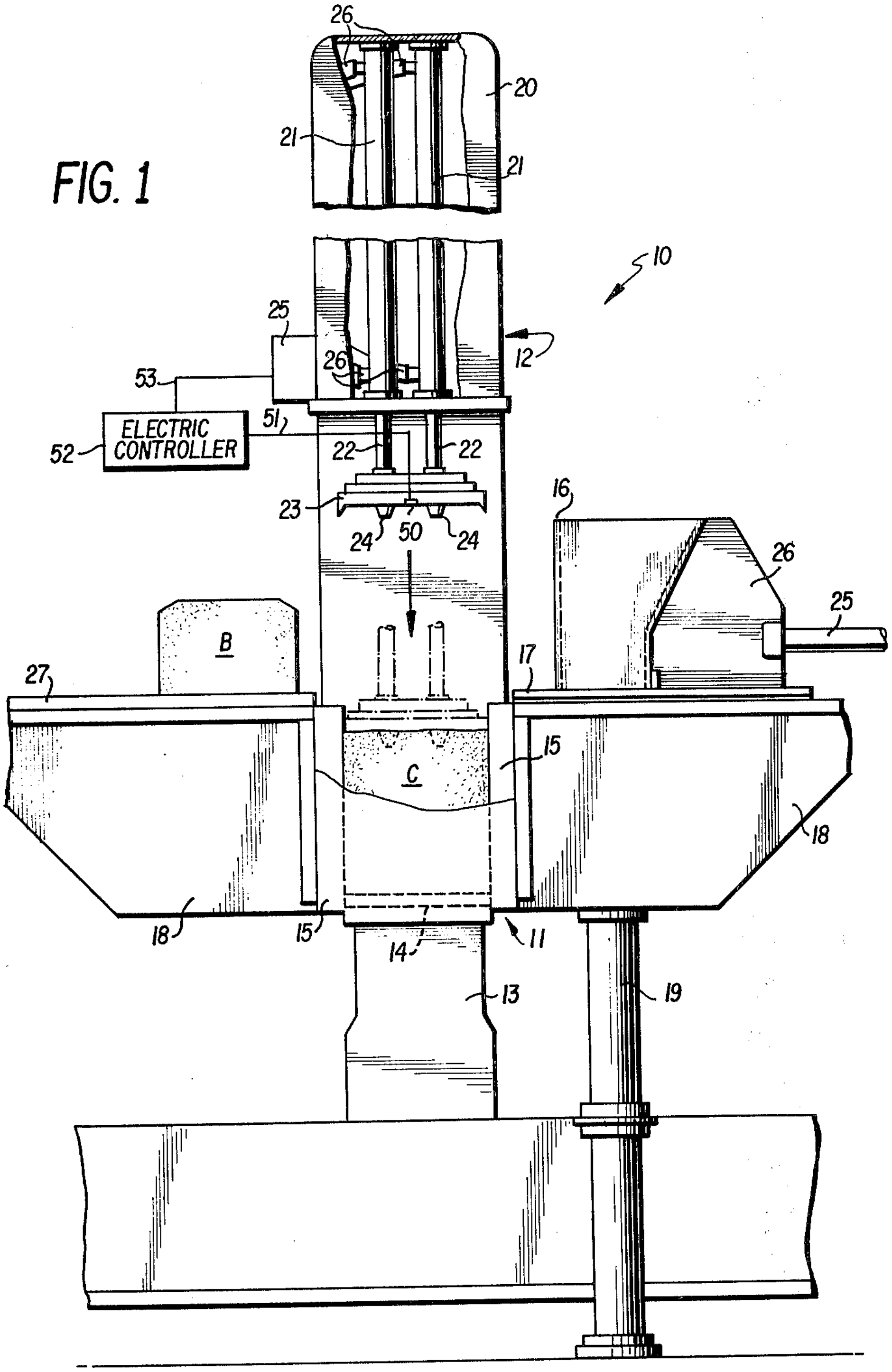
FIG. 1 is a front elevation view of the anode forming apparatus of this invention, and illustrates the hydraulically actuated press ram (partially broken to conserve space), movable mold, bolster, and electrical and hydraulic control systems for the press ram shown schematically; and depicts in phantom the press ram with protrusions therefrom extending into the aggregate in the mold.

Referring now to the drawings in detail, there is illustrated in FIG. 1 an anode vibrator and press apparatus designated generally by the numeral 10. The apparatus 10 includes a movable mold 11 and a press 12. The mold 11 includes a bolster portion 13 having a vibrating plate 14 disposed at the upper end thereof and vertically movable side walls 15 (shown in their uppermost position), which, in their lowermost position, encompass the bolster 13 as seen more clearly in FIG. 3.

A feedbox 16 is movable horizontally on rails 17 carried by support member 18. The support member 18 is vertically movable by a hydraulic lift 19 for a purpose to be hereinafter described.

The press 12 includes a housing portion 20 which contains hydraulic cylinders 21 from which rods 22 extend to support a press ram 23. The press ram 23 includes truncated conical protrusions 24 extending from the lower face thereof. Conventional hydraulic control means 25 having conduits 26 extending into the hydraulic cylinders 21 are provided to raise and lower the press ram 23 between the mold walls 15 of the movable mold 11.

The operation of the apparatus 10 is as follows: With the feedbox 16 containing a charge of carbon aggregate, the support member 18, which carries the movable mold walls 15 as well as the feedbox 16, is lowered by means of the hydraulic lift 19 to a position as shown in FIG. 3 where the mold walls 15 encompass the bolster 13. A hydraulic ram 25 is then actuated to slide the feedbox 16, throuh the medium of a connecting pushing member 26, horizontally along the rails 17 to a position over the vibrating plate 14. The hydraulic lift 19 is then raised, thereby raising the feedbox 16 and leaving the carbon aggregate C retained in the mold 11 between the mold walls 15 which have been correspondingly raised by the hydraulic lift 19 and the support member 18. The feedbox 16 is then withdrawn to the right by the hydraulic ram 25 to the position shown in FIG. 1. The hydraulic control mechanism 25 is then activated to bring the press ram 23 down into proximity to the upper surface of the aggregate C and the vibration mechanism (FIGS. 2 and 3) activated to vibrate the table 14 and thereby initiating the compaction of the material. The press ram 23 then continues downward with the protrusions 24 entering into the aggregate C and permitting the aggregate to form thereabout. As the upper surface of the aggregate descends owing to the compaction thereof, the press ram 23 continues to move downwardly keeping the protrusions 24 imbedded in the aggregate while means (to be described hereinafter) control the downward movement of the press ram 23 such that it applies little or no pressure against the aggregate C. Also, as the aggregate is being compacted, the mold walls 15 are being moved downwardly by means of the hydraulic lift 19 and support member 18 such that the relative motion between the aggregate C and mold walls 15 is approximately zero. Upon completion of material compaction, the vibrating mechanism is deactivated and the press ram 23 continues to lower and applies sufficient pressure to further compact the aggregate C and to finish form the upper surface thereof to conform to the shape of the protrusions 24. With support member 18, hydraulic lift 19, and molds walls 15 in their lowermost positions, the hydraulic ram 25 moves the feedbox 16 to the left to push the formed anode block B off of the vibrating plate 14 onto receiving table 27 which constitutes the upper surface of the left-most portion of the support member 18. The anode block B is subsequently removed from the table 27 and baked into a finished product.

Figure 2:
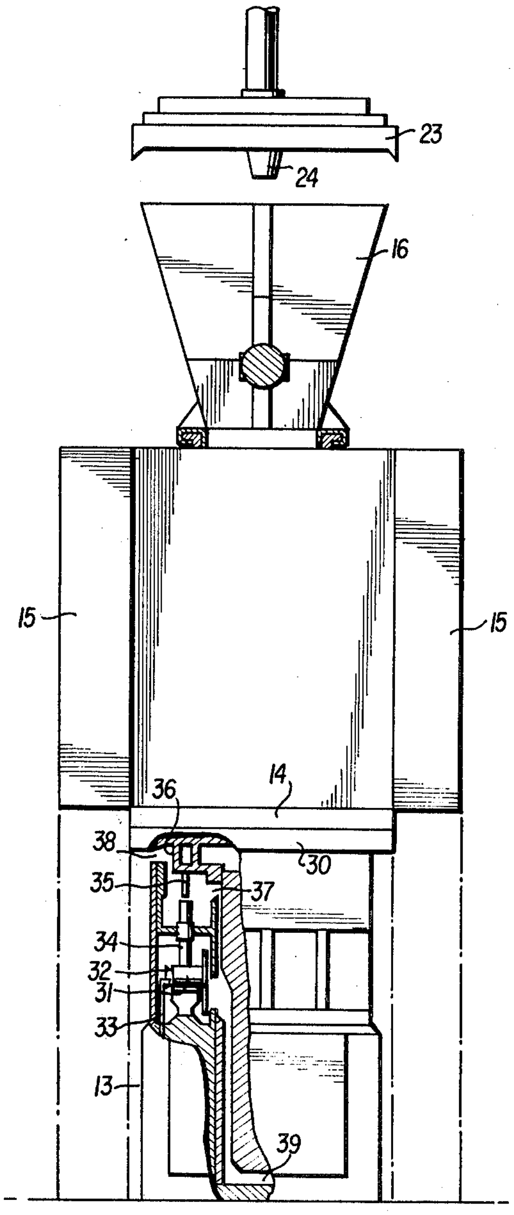
FIG. 2 is a front elevation view of the anode forming apparatus, the mold walls shown in their uppermost position, and is partially broken away to illustrate a pneumatically operated vibrator which is shown in section.
Figure 3:
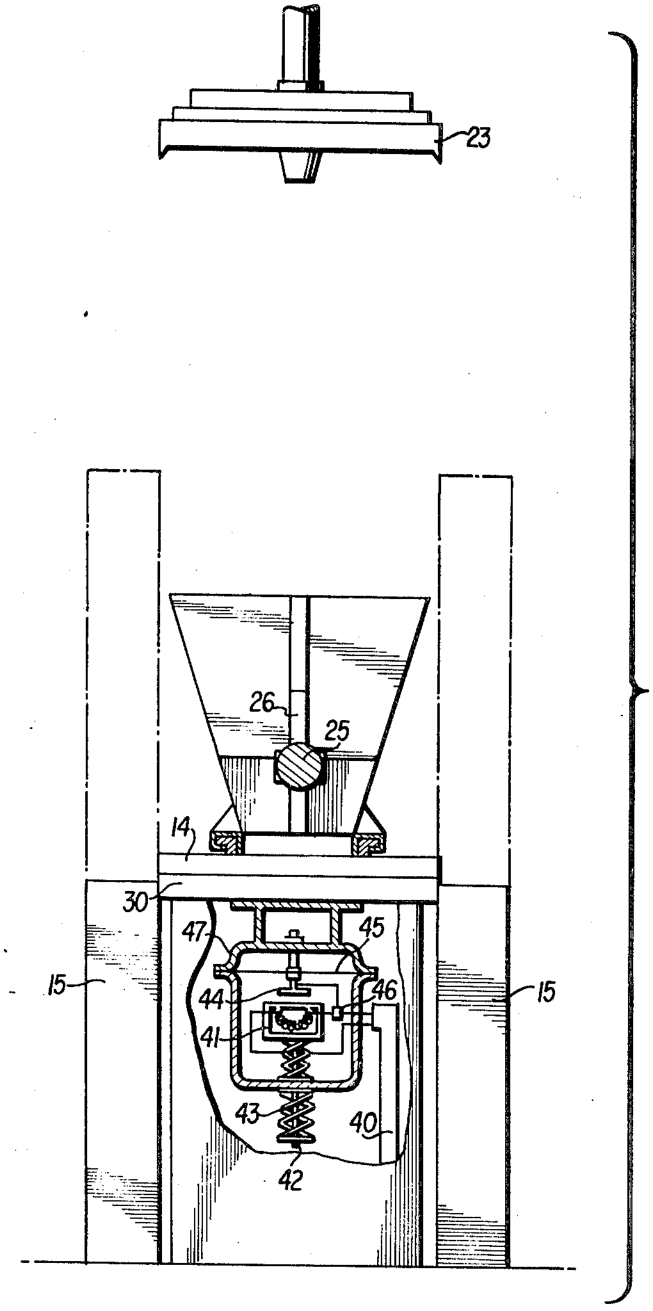
FIG. 3 is a front elevation view of the anode forming apparatus, the mold walls shown in their lowermost position encompassing the bolster and vibrating means, and is partially broken away to illustrate an electrically operated vibrator shown in cross-section.

Referring now to FIG. 2, it can be seen that the bolster 13 includes a vibrating device 30 which is mounted below the vibrating plate or table 14. The bolster 13, vibrating device 30, and vibrating plate or table 14 are designed so that when deactivated will withstand the full working load of the press ram 23. The vibrating device 30 is operated by air entering air cylinder 31 through air intake 32 by way of conduit 33. This forces a shaft 34, extending from air cylinder 31, upward into contact with a striking pin 35 which is mounted on a connecting member 36. The connecting member 36 is fixedly attached to the vibrating device 30. The motion of the shaft 34 is transmitted through the striking pin 35 and connecting member 36 to the vibrating device 30. Vibrating device 30, in turn, shakes the vibrating plate or table 14 and thus aggregate contained within the mold walls 15. Exhaust air flows through an air passageway 37 and exits at exhaust openings 38 and 39. The vibrator operates until virtually all air trapped between the aggregate particles is expelled, thereby compacting the aggregate into the desired anode form.

An electrical vibrator is illustrated in FIG. 3 which may be substituted for the pneumatic vibrator discussed above in connection with FIG. 2. Current enters the electric vibrator through conductors within conduit 40 and is transmitted to coil 41 which is mounted on a shaft 42. A balancing or stabilizing spring assembly 43 surrounds the shaft 42. When current flows through the coil 41, a force field is created which attracts a contact plate 44. The contact plate 44 is mounted through and beneath a flexible diaphragm 45. When the coil 41 and contact plate 44 make contact, an overload switch 46 interrupts the current flow to the coil 41. The diaphragm 45 and spring assembly 43 then return to their original positions, thus creating vibration. The frequency of this connection and disconnection is predetermined by the design parameters and specifications of the diaphragm 45, coil 41, spring assembly 43, and overload switch 46. The movement of diaphragm 45 transmits vibration through a vibrator superstructure 47 which is connected to the vibrating device 30 which, in turn, is connected to the vibrating plate 14.

In accordance with this invention, means are provided for controlling the movement of the press ram 23 at a rate corresponding to the compaction rate of the aggregate C. Such means may include any means which is capable of sensing or monitoring the compaction rate of the aggregate and generating a signal in response thereto by means of which the hydraulic control system 25 of the press 12 can be controlled. Referring once again to FIG. 1, it can be seen that the press ram 23 includes a pressure transducer 50 disposed in the lower face of the ram 23 between the protrusions 24. The pressure transducer 50 is electrically connected by means of control line 51 to an electrical controller 52, such as a solenoid, servo-motor of the like, which is, in turn, connected through appropriate means 53 to the hydraulic control system 25. The pressure transducer 50 is so designed that upon the appearance of a predetermined pressure thereagainst, owing to its engagement against the carbon aggregate C, an electrical signal will be generated which is transmitted through the line 51 to the electrical controller 52. The electric controller 52, through the connecting means 53, then controls the hydraulic control system 25 to either slow or stop the descent of the press ram 23. Consequently, the press ram 23 will descend at a predetermined rate until such time as the pressure transducer 50 bears against the aggregate C with sufficient pressure to activate the controller 52. It should be apparent, therefore, that if the threshold pressure is sufficiently low, the press ram 23 will follow the descent of the upper surface of the aggregate C at a rate corresponding to the compaction rate of the aggregate.

Figure 4:
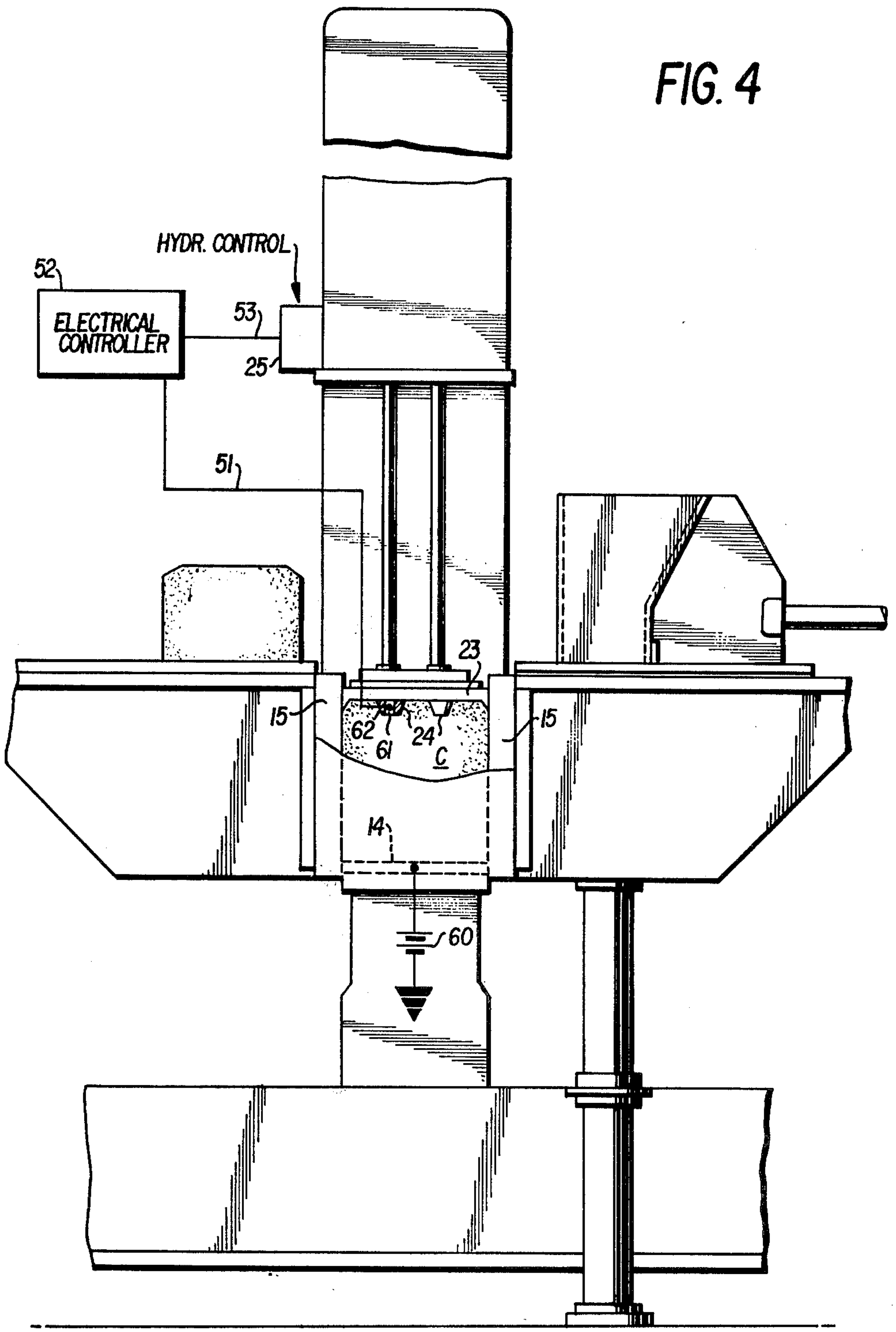
FIG. 4 is a front elevation view of the anode forming apparatus similar to FIG. 1, and further illustrates schematically another embodiment of the electrical and hydraulic control system for the press ram.

Referring now to FIG. 4, there is illustrated therein an alternate embodiment of the control apparatus of this invention. A DC voltage source 60, having its negative pole grounded, has its positive pole connected to the vibrator plate 14. An electrical contact 61 is recessed into one of the protrusions 24 on the face of the press ram 23 and is electrically insulated therefrom by insulator 62. The electrical contact 61 is connected to the electrical controller 52 through line 51, and the controller 52 is, in turn, connected to the hydraulic control system 25 through connecting means 53 as in the embodiment of FIG. 1.

The operation of the control system of FIG. 4 should be apparent. Provided that the mold walls 15 are insulated or otherwise nonconductive, no current will flow from the voltage source 60 until the press ram 23 is brought down into contact with the aggregate C and contact is made at the electrical contact 61. At this point, current will flow through the line 51 to the electrical controller 52 which thereby commands the hydraulic control system 25 to retard or stop the downward advance of the press ram 23. However, as soon as contact is broken between the aggregate C and the electrical contact 61, which occurs, of course, when the upper surface of the aggregate C descends owing to the compaction thereof as it is being vibrated, the control circuit is broken and the hydraulic control system 25 will cause the ram 23 to advance. It should be understood, therefore, that the press ram 23 will follow the upper surface of the aggregate C downwardly at a rate corresponding to the compaction rate of the aggregate.

Figure 5:
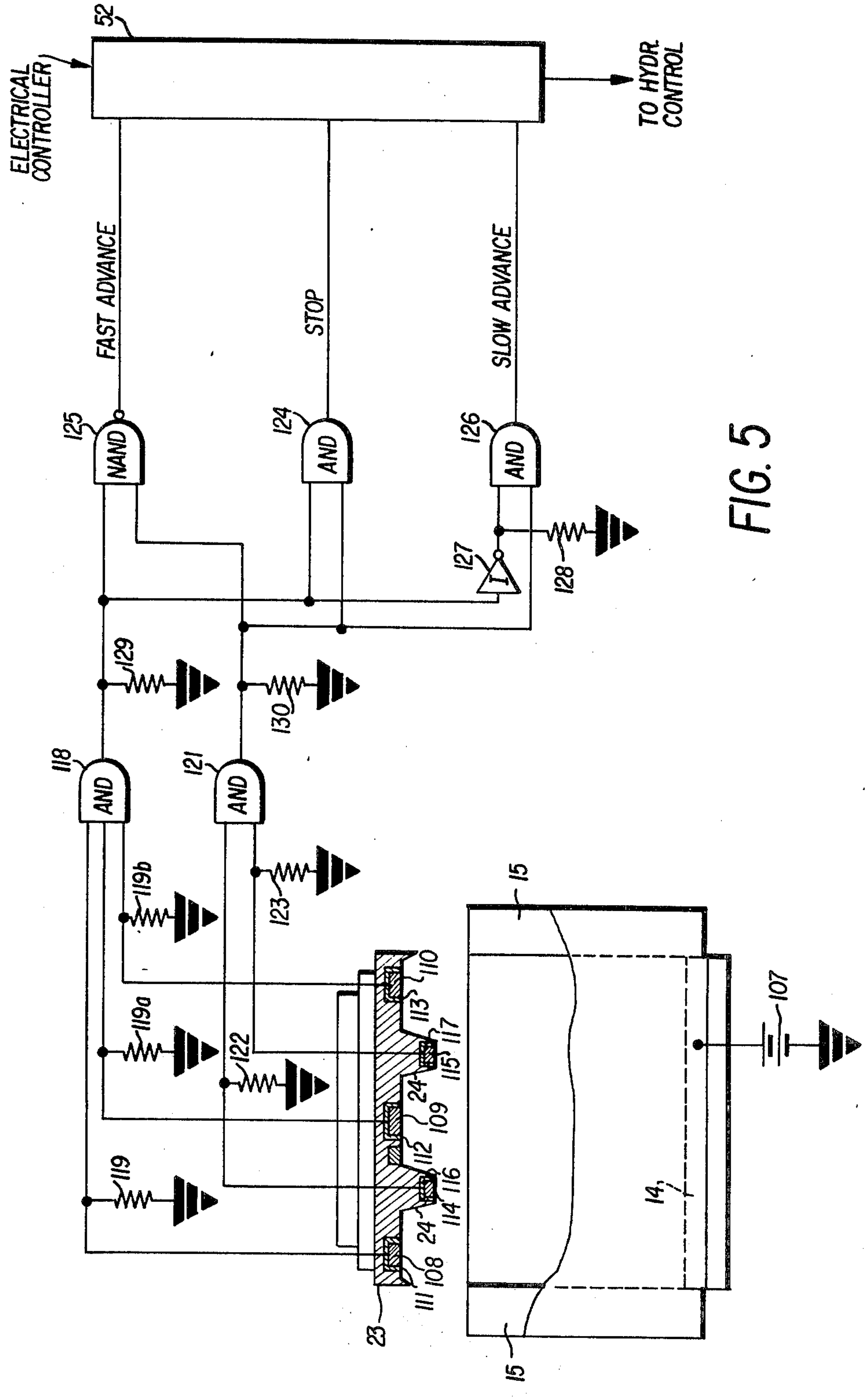
FIG. 5 is a schematic diagram of a preferred embodiment of the electrical control circuit which may be used with the apparatus of FIG. 4, portions of the apparatus being shown diagrammatically.

A preferred embodiment of the electrical control circuit of FIG. 4 is illustrated schematically in FIG. 5. As seen in FIG. 5, a DC voltage source 107, having its negative pole grounded, has its positive pole connected to the vibrator plate 14. The lower face of the press ram 23 is provided with three recessed electrical contacts 108, 109 and 110; these contacts are insulated from the ram 23 by respective insulators 111, 112 and 113. Two additional recessed electrical contacts 114 and 115 are provided respectively in the lowermost surface of the protrusions 24, respectively. The contacts 114 and 115 are respectively insulated from the ram 23 by insulators 116 and 117.

The three electrical contacts 108, 109 and 110 are respectively connected to individual input terminals of an AND circuit 118. Each of the three input connections of the AND circuit 118 is also connected to ground via a respective resistor **119, 119*a* and 119*b*.**

The two electrical contacts 114 and 115 are respectively connected to individual input terminals of an AND circuit 121. Each of the two input terminals of the AND circuit 121 is also connected to ground via a respective resistor 122 and 123.

The output terminals of the AND circuits 118 and 121 are connected to respective input terminals of a further AND circuit 124, and to respective input terminals of a NAND circuit 125. The output terminal of the AND circuit 121 is also connected to an input terminal of an additional AND circuit 126. The output terminal of the AND circuit 118 is connected to an input terminal of the AND circuit 126 via an inverter 127. The output terminal of the inverter 127 is connected to ground via a resistor 128. The output terminals of the AND circuits 118 and 121 are also connected respectively to ground via resistors 129 and 130, respectively.

The output terminals of the NAND circuit 125, the AND circuit 124 and the AND circuit 126 are each connected to the electrical controller 52 so as to supply command signals thereto. The NAND circuit 125 provides a ONE signal as fast advance command signal, the AND circuit 126 provides a ONE signal as a slow advance command signal, and the AND circuit 124 provides a ONE signal as a stop command signal.

The operation of the control circuit of FIG. 5 is to be described briefly below, starting with the assumption that the press ram 23 is in the position shown; that is, spaced from the top surface of the carbon aggregate C. In this position no current flows from the DC source 107 through the mass of carbon granules. In this condition, all input signals to the AND circuits 118 and 121 are ZERO, and their respective output signals are ZERO. The NAND circuit 125 provides a ONE signal, in response to the two ZERO signals it receives, which ONE signal is fed to the controller 52 as a fast advance command signal. The electrical controller 52 energizes the hydraulic control system 25 (FIGS. 1 and 4) to cause the ram 23 to move downwardly at a relatively fast rate until both of the contacts 114 and 115 contact the upper surface of the carbon aggregate C.

When contact is made between each of the contacts 114 and 115 and the carbon aggregate, current flows through the resistors 122 and 123 placing ONE signals on the input terminals of the AND gate 121. A ONE signal appears consequently on one input terminal of the NAND gate 125, causing its output signal to become ZERO, thus terminating the fast advance command signal to controller 52. The output signal from the AND circuit remains ZERO, the output signal appears as a ONE signal on one input terminal of the AND circuit 126 because of the inverter 127. The other input terminal of the AND circuit 126 receives the ONE signal from the AND circuit 121 and, consequently, produces a ONE signal on its output. This ONE signal is fed to the controller 52 as a slow advance command signal. The controller 52 effects relatively slow, downward movement of the ram 23 until each of the three contacts 108, 109 and 110 contact the upper surface of the carbon aggregate.

Upon contact between each of the contacts 108, 109, 110 and the carbon aggregate, current flows in each of the resistors 119, 120 and 121 thereby placing a ONE signal on each input terminal of the AND circuit 118, causing its output terminal to exhibit a ONE signal which, because of the action of the inverter 127, appears as a ZERO signal at one input terminal of the AND circuit 126. Consequently, the output signal of the AND circuit 126 becomes ZERO thereby terminating the slow advance command signal to the controller 52.

The two input terminals of the AND gate receive the two ONE signals from the AND circuits 118 and 121 causing its output terminal to exhibit a ONE signal, which signal is supplied to controller 52 as a stop command signal. In response to the stop command signal, the controller 52 energizes the hydraulic control system 25 to halt the advance of the ram 23. This condition will prevail until the upper surface of the carbon aggregate falls away from any of the contacts 108, 109, 110, 114, and 115. In the event the surface of the carbon aggregate, due to action of the vibrator plate 14, falls away from any of the contacts 108, 109 and 110, a slow advance command signal is again produced. In the event the surface of the carbon aggregate falls away from either the contacts 114 or the contact 115, a fast advance command signal is again produced.

It is to be appreciated that the control circuit of FIG. 5 functions quickly and, in effect, advances the ram 23 at substantially the same rate as the surface of the mass of carbon granules moves downwardly, Moreover, the control circuit operates to assure that the protrusions 24 remain in the mass of carbon aggregate because of the fast advance command signal.

It should be understood that other control circuits could be used within the scope of this invention, and particularly other logic circuits in connection with the embodiment of FIG. 5. For example, while electrical and pressure sensing control means have been specifically illustrated and described herein, it is contemplated that wave energy sensing means could be utilized as proximity switches and other sonic sensors which can be used to maintain the press ram 23 in a predetermined spaced relation from the mass of carbon aggregate.

The press of the present invention need exert only approximately one-tenth the pressure required by prior art presses to form anodes of comparable size and density. Prior art presses require a minimum of approximately 4,000 psi to form an anode of advantageous size and density, whereas the press of the present invention requires only approximately 400 psi pressure. Thus, the present invention allows use of a much smaller press, saving equipment costs and operating expense.

Although only preferred embodiments of the invention have been specifically described and illustrated herein, it is to be understood that minor variations may be made without departing from the spirit of the invention.

What is claimed:

1. In a method of forming a carbon anode block, having indentations in the upper surface thereof, comprising the steps of:

a. discharging carbon aggregate into a vertically movable mold;
b. vibrating the aggregate in the mold to expel substantially all air therefrom and cause compaction thereof, the upper surface of the aggregate thereby moving downwardly; and
c. compressing the aggregate by lowering a press ram thereagainst to further compact its particles and to form indentations in the aggregate conforming to protrusions on the lower face of the press ram; the improvement comprising;
d. synchronizing the lowering of the press ram during vibration of the aggregate with the lowering of the upper surface of the aggregate which occurs as a result of the vibration so that the aggregate will form around the protrusions on the lower face of the press ram, and maintaining only enough pressure by the press ram to contain the aggregate within the movable mold until substantially all air has been expelled from the aggregate, wherein said synchronizing step is accomplished by sensing changes in the relative positions of the upper surfaces of the aggregate and the press ram, which changes occur as a result of the vibration, generating a control signal in response to the sensing, and positively controlling the lowering of the press ram in response to said signal so that it moves at a rate corresponding substantially to the compaction rate of the aggregate applying little or no pressure thereagainst, and wherein said sensing step is performed by passing an electrical current through the aggregate.

2. The method according to claim 1, further including the steps of stopping the vibration after substantially all air has been expelled from the aggregate, and then continuing the lowering of the press ram to finish form the top surface of the aggregate to conform to the protrusions on the lower face of the press ram and to further compact the aggregate by applying an additional compacting force.

3. The method of claim 1, wherein the carbon aggregate is vibrated by a pneumatic actuator.

4. The method of claim 1, wherein the carbon aggregate is vibrated by an electrically actuated vibrator.

5. In a method of forming a carbon anode block, having indentations in the upper surface thereof, comprising the steps of:

a. discharging carbon aggregate into a vertically movable mold;
b. vibrating the aggregate in the mold to expel substantially all air therefrom and cause compaction thereof, the upper surface of the aggregate thereby moving downwardly; and
c. compressing the aggregate by lowering a press ram thereagainst to further compact its particles and to form indentations in the aggregate conforming to protrusions on the lower face of the press ram; the improvement comprising:
d. synchronizing the lowering of the press ram during vibration of the aggregate with the lowering of the upper surface of the aggregate which occurs as a result of the vibration so that the aggregate will form around the protrusions on the lower face of the press ram, and maintaining only enough pressure by the press ram to contain the aggregate within the movable mold until substantially all air has been expelled from the aggregate, wherein said synchronizing step is accomplished by sensing changes in the relative positions of the upper surfaces of the aggregate and the press ram, which changes occur as a result of the vibration, generating a control signal in response to the sensing, and positively controlling the lowering of the press ram in response to said signal so that it moves at a rate corresponding substantially to the compaction rate of the aggregate applying little or no pressure thereagainst, and wherein said sensing step is performed by providing a reference threshold pressure, monitoring the pressure applied by the press ram against the aggregate, and generating said control signal only upon the appearance of an applied pressure which exceeds the threshold pressure.

6. The method according to claim 5, further including the steps of stopping the vibration after substantially all air has been expelled from the aggregate, and then continuing the lowering of the press ram to finish form the top surface of the aggregate to conform to the protrusions on the lower face of the press ram and to further compact the aggregate by applying an additional compacting force.

7. The method of claim 5, wherein the carbon aggregate is vibrated by a pneumatic actuator.

8. The method of claim 5, wherein the carbon aggregate is vibrated by an electrically actuated vibrator.

* * * * *